(12) United States Patent
Parrish et al.

(10) Patent No.: US 10,895,257 B2
(45) Date of Patent: Jan. 19, 2021

(54) LUBRICATION STRATEGY FOR DRY RUN PUMP SYSTEM

(71) Applicant: GM GLOBAL TECHNOLOGY OPERATIONS LLC, Detroit, MI (US)

(72) Inventors: Robert Parrish, White Lake, MI (US); Michael P. Fannin, Brighton, MI (US); Ted T. Selever, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 325 days.

(21) Appl. No.: 15/895,046

(22) Filed: Feb. 13, 2018

(65) Prior Publication Data

US 2019/0249663 A1     Aug. 15, 2019

(51) Int. Cl.
     *F04C 15/00*     (2006.01)
     *F04C 2/10*      (2006.01)
     (Continued)

(52) U.S. Cl.
     CPC ........... *F04C 15/0092* (2013.01); *F01M 1/02* (2013.01); *F04C 2/10* (2013.01); *F04C 13/005* (2013.01);
     (Continued)

(58) Field of Classification Search
     CPC .... F01M 1/02; F01M 1/18; F01M 2001/0238; F01M 2001/0253; F04C 13/005; F04C 14/04; F04C 15/0038; F04C 15/0076; F04C 15/0088; F04C 15/0092; F04C 15/06; F04C 2210/14; F04C 2240/30; F04C 2240/50;
     (Continued)

(56) References Cited

U.S. PATENT DOCUMENTS 2,790,394 A * 4/1957 Mori ...................... F04C 2/113
                                                             418/1
3,117,527 A * 1/1964 Messmer ................ F04C 2/101
                                                             418/77

(Continued)

OTHER PUBLICATIONS

U.S. Appl. No. 15/361,734, filed Nov. 28, 2016 by GM Global Technology Operations LLC.

(Continued)

*Primary Examiner* — Patrick Hamo
*Assistant Examiner* — Paul W Thiede (57) ABSTRACT

A gerotor pump assembly, and a system and method for operating a gerotor pump assembly, result in a lubrication strategy for operating in a loss-of-prime mode. An inner drive gear may be rotated in a first direction and in a second opposite direction about an axis of rotation. The inner drive gear has a number of projections extending outwardly therefrom. An outer driven gear surrounds the inner drive gear and defines a number of recessions along an inner surface configured to engage with the projections of the inner drive gear. The outer driven gear and the inner drive gear further define at least one dynamically-changing fluid cavity therebetween. The inner drive gear and the outer driven gear define an oil transfer volume clearance between a projection and a recession in a fully engaged position. Oil is maintained within the oil transfer volume clearance as the inner drive gear is rotated.

7 Claims, 11 Drawing Sheets

(51) Int. Cl.
*F04C 13/00* (2006.01)
*F04C 15/06* (2006.01)
*F01M 1/02* (2006.01)

(52) U.S. Cl.
CPC .......... *F04C 15/0038* (2013.01); *F04C 15/06* (2013.01); *F01M 2001/0238* (2013.01); *F04C 15/0076* (2013.01); *F04C 2210/14* (2013.01); *F04C 2240/50* (2013.01); *F04C 2240/809* (2013.01)

(58) Field of Classification Search
CPC .. F04C 2240/809; F04C 2270/24; F04C 2/10; F04C 2/102; F04C 2210/0206; F04C 2240/20; F04C 2240/60; F04C 15/0049; F04C 2/084; F04C 2/103; F16N 13/20; F16N 2260/00
USPC ...... 418/1, 61.3, 77, 79, 132, 166, 171, 190, 418/191, 270
See application file for complete search history.

(56) References Cited

U.S. PATENT DOCUMENTS

| | | | | |
|---|---|---|---|---|
| 5,096,398 | A | * | 3/1992 | Cozens ................ F04C 15/06 418/171 |
| 5,730,633 | A | * | 3/1998 | Henmi ................ B63H 23/321 440/112 |
| 2008/0103009 | A1 | * | 5/2008 | Park .................. B60K 23/0808 475/231 |
| 2015/0322942 | A1 | * | 11/2015 | Liu ......................... F01M 1/02 418/61.1 |
| 2016/0290484 | A1 | * | 10/2016 | Lenczewski ........ F16H 57/0483 |
| 2017/0122311 | A1 | * | 5/2017 | Moetakef ............... F01M 1/02 |
| 2018/0058450 | A1 | | 3/2018 | McGowan et al. |

OTHER PUBLICATIONS

U.S. Appl. No. 15/641,411, filed Jul. 5, 2017 by GM Global Technology Operations LLC.

* cited by examiner

LUBRICATION STRATEGY FOR DRY RUN PUMP SYSTEM

TECHNICAL FIELD

The present disclosure relates to a lubrication strategy for a dry run pump system of a motor vehicle propulsion system assembly.

INTRODUCTION

The flow of oil or liquid fluid within a motor vehicle transmission or drive unit is controlled in a manner to lubricate moving components contained therein and to actuate various subsystems, such as clutches, when needed. A transmission or drive unit assembly typically includes a sump volume configured to store such fluid, as well as to provide desired amounts of the fluid to various components and subsystems within the drive unit or transmission. A pump is used to pump fluid from the sump to the various components. A typical pump is designed to draw in fluid and pump all of the drawn-in fluid to the various components.

A typical pump must be able to access a consistent supply of liquid fluid, such as oil, to avoid damage to the pump. Therefore, providing a sufficient sump volume of oil is typically a required design constraint in a pump system design. The pump inlet is kept covered by fluid to avoid damage to a pump system.

SUMMARY

The present disclosure provides a pump system that does not require the pump inlet to be constantly covered by fluid during operation. This allows unique and lighter packaging to be used for the pump system and the associated transmission system in a motor vehicle. In addition, the pump may operate in a reverse direction, wherein the outlet becomes the inlet in the opposite direction, and the pump may operate without the reverse inlet (outlet-turned-inlet) being constantly covered. Such a pump is configured to maintain some oil within the gerotor dynamically-changing cavities while the pump is operating, which then helps the pump to self-preserve by being lubricating when the inlet (or reverse inlet) is not covered by oil. In addition, the pump may provide extra lubrication to a pump running face via a cavity formed in the pump running face.

In one form, which may be combined with or separate from the other forms disclosed herein, a gerotor pump assembly includes a shaft, an inner drive gear coupled to the shaft, and an outer driven gear surrounding the inner drive gear. The shaft and the inner drive gear are rotatable about an axis of rotation defined along a length of the shaft. The inner drive gear has a plurality of projections extending outwardly along an outer periphery thereof. The inner drive gear defines a pump running face along a side of the inner drive gear. The pump running face defines a lubrication cavity therein. The outer driven gear defines a plurality of recessions along an inner surface configured to engage with the plurality of projections of the inner drive gear. The outer driven gear and the inner drive gear further define at least one dynamically-changing fluid cavity therebetween. Each projection is configured to engage with a recession of the plurality of recessions in a fully engaged position. The inner drive gear and the outer driven gear define an oil transfer volume clearance between a projection and a recession in the fully engaged position. The outer driven gear has a bearing surface along an outer periphery thereof. A housing structure defines first and second ports in fluid communication with the bearing surface. The housing structure defines a forward inlet fluid reservoir therein, the forward inlet fluid reservoir being in fluid communication with the dynamically-changing fluid cavity or cavities. The forward inlet fluid reservoir is in fluid communication with the first port. The housing structure further defines a forward outlet fluid reservoir therein, the forward outlet fluid reservoir being in fluid communication with the dynamically-changing fluid cavity or cavities. The forward outlet fluid reservoir is in fluid communication with the second port. At least a portion of the forward outlet fluid reservoir is located on an upper side of the second port, and the first port is located on a lower side of the second port.

In another form, which may be combined with or separate from the other forms described herein, the present disclosure provides a method of operating a gerotor pump assembly for an automotive transmission of a motor vehicle in a loss-of-prime mode. The method includes rotating an inner drive gear in a first direction about an axis of rotation, wherein the inner drive gear has a plurality of projections extending outwardly along an outer periphery thereof and an outer driven gear surrounds the inner drive gear and defines a plurality of recessions along an inner surface configured to engage with the plurality of projections of the inner drive gear, and wherein the outer driven gear and the inner drive gear further define at least one dynamically-changing fluid cavity therebetween, each projection being configured to engage with a recession in a fully engaged position, the inner drive gear and the outer driven gear defining an oil transfer volume clearance between a projection and a recession in the fully engaged position. The method includes maintaining oil within the oil transfer volume clearance as the inner drive gear is rotated in the first direction.

In yet another form, which may be combined with or separate from the other forms described herein, a system for providing lubrication to a gerotor pump assembly is provided. The system includes a shaft, an inner drive gear coupled to the shaft, and an outer driven gear surrounding the inner drive gear. The shaft and the inner drive gear are rotatable about an axis of rotation defined along a length of the shaft. The inner drive gear has a plurality of projections extending outwardly along an outer periphery thereof, and the outer driven gear defines a plurality of recessions along an inner surface configured to engage with the plurality of projections of the inner drive gear. The outer driven gear and the inner drive gear further define at least one dynamically-changing fluid cavity therebetween. Each projection is configured to engage with a recession of the plurality of recessions in a fully engaged position, and the inner drive gear and the outer driven gear define an oil transfer volume clearance between a projection and a recession in the fully engaged position. The inner drive gear is configured to be rotated in a first direction about the axis of rotation and a second direction about the axis of rotation, the first direction being opposite the second direction. The inner drive gear and the outer driven gear are configured to maintain oil within the oil transfer volume clearance as the inner drive gear is rotated in the first direction and in the second direction.

Additional features may be provided, including but not limited to the following: the housing structure having a main body portion and a cover attached to the main body portion; the cover being disposed adjacent to the pump running face; the inner drive gear defining an inner aperture through the pump running face; the lubrication cavity extending inwardly from the inner aperture; a ball bearing arrangement having an inner race fixed to the shaft and an outer race fixed to the cover; a seal disposed between the shaft and the cover; a shaft cavity being defined between the shaft, the cover, the ball bearing arrangement, and the seal; the shaft cavity being configured to collect a first volume of oil; a bushing cap disposed over an end of the shaft; the gerotor pump assembly defining a hollow space between the bushing cap and the end of the shaft configured to collect a second volume of oil therein; the first and second ports being defined in the main body portion; the first and second ports being formed on a leading edge of the main body portion; the forward inlet fluid reservoir being formed in both the main body portion and the cover; a side chamber of the forward inlet reservoir being symmetrically disposed about the outer driven gear; the forward outlet fluid reservoir being formed both in the main body portion and the cover of the housing structure; a side chamber of the forward outlet fluid reservoir being symmetrically disposed about the outer driven gear; the forward inlet fluid reservoir being in fluid communication with a filter; the inner drive gear being configured to draw fluid from a sump, through the filter, and into the forward inlet fluid reservoir; the forward outlet fluid reservoir having an entrance opening in fluid communication with the dynamically-changing fluid cavity and an outlet opening defined on an upper side of the entrance opening; the forward inlet fluid reservoir having an exit opening in fluid communication with the dynamically-changing fluid cavity and an inlet opening defined on an upper side of the exit opening; the inlet opening being disposed on an upper side of the second port; and the oil transfer volume clearance being at least 500 microns wide.

Further additional features or steps may be provided, including but not limited to the following: rotating the inner drive gear in a second direction about the axis of rotation, the second direction being opposite the first direction; maintaining oil within the oil transfer volume clearance as the inner drive gear is rotated in the second direction; adding oil into a forward outlet fluid reservoir when the inner drive gear is rotated in the first direction; adding oil into a forward inlet fluid reservoir when the inner drive gear is rotated in the second direction; lubricating a pump running face of the inner drive gear via a plurality of lubrication cavities defined within the pump running face; lubricating a bearing surface disposed along an outer periphery of the outer driven gear via at least one of a first port in fluid communication with the forward inlet fluid reservoir and a second port in fluid communication with the forward outlet fluid reservoir; collecting oil within a shaft cavity defined between a seal, a cover, a ball bearing arrangement, and a shaft upon which the inner drive gear is mounted; and collecting oil within a hollow space defined between the shaft and a bushing cap attached to an end of the shaft.

The above features and advantages, and other features and advantages of the present disclosure, will be readily apparent from the following detailed description of the many aspects of the present disclosure when taken in connection with the accompanying drawings and appended claims.

BRIEF DESCRIPTION OF THE DRAWINGS

The drawings are included for illustration only and are not intended to limit the scope of this disclosure or the appended claims.

DETAILED DESCRIPTION

Figure 1:
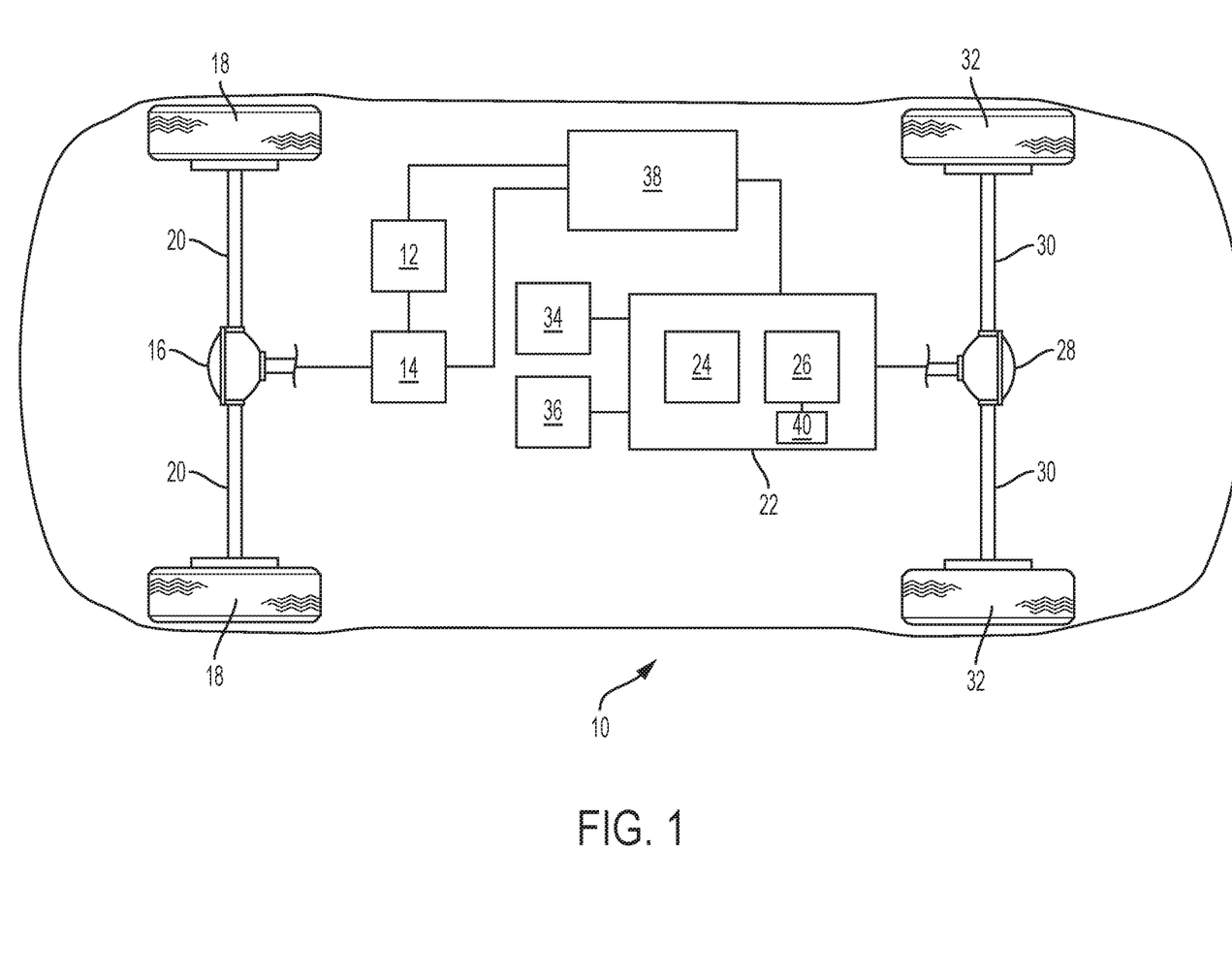
FIG. 1 is a schematic plan view of a motor vehicle system including a drive unit having a gerotor pump assembly, in accordance with the principles of the present disclosure.

Referring to the drawings, wherein like reference numbers correspond to like or similar components throughout the several figures, a motor vehicle is illustrated and generally designated at 10. The motor vehicle 10 may be any type of vehicle, such as a car, truck, van, sport-utility vehicle, etc.

The motor vehicle 10 includes a main engine 12 (which could be an internal combustion engine, an electric engine, or a hybrid, by way of example). The main engine 12 is interconnected with a transmission 14 and a final drive unit 16. The transmission 14 may be a stepped transmission having planetary gears, a countershaft transmission, a continuously variable transmission, or an infinitely variable transmission, by way of example. Torque from the transmission 14 is communicated through the final drive unit 16 to a first set of drive wheels 18, which may be front or rear wheels. The final drive unit 16 generally includes a differential that transfers torque through axles 20 to the drive wheels 18.

The vehicle 10 also includes an electric drive unit 22 for all-wheel-drive (AWD) applications, by way of example. The drive unit 22 includes an electric traction motor 24 coupled to a secondary transmission 26. The secondary transmission 26 is connected to another final drive unit 28, which generally includes a differential that transfers torque through a second set of axles 30 to a second set of drive wheels 32. Thus, the electric motor 24 generates torque that is ultimately applied to the second set of wheels 32 when AWD applications are selected or when it is otherwise desirable to drive the second set of wheels 32. The secondary transmission 26 may be supplied with fluid, such as oil, via a pump 40.

The electric motor 24 may be interconnected with a 12 Volt vehicle battery 34, and also to a high voltage battery 36 used in hybrid or electric vehicles, such as 360 Volt hybrid battery. Both batteries 34, 36 may be connected to the electric motor 24 through a power inverter (not shown). The engine 12, transmission 14, and drive unit 22 may be controlled by a control system 38, which may include one or more controllers (not shown in detail), by way of example.

The vehicle 10 may have little clearance over ground height. For this and over reasons, the pump 40 may have a shallow sump from which to draw fluid. Therefore, prime to the pump 40 may be interrupted while operating in a forward direction. The pump 40 is bi-directional to accommodate a forward and reverse direction of the vehicle 10; however, the fluid supply to the reverse direction of the pump 40 originates from a finite storage container, and therefore, fluid coverage may also be interrupted while the pump 40 and vehicle 10 are operating in reverse.

Figure 2:
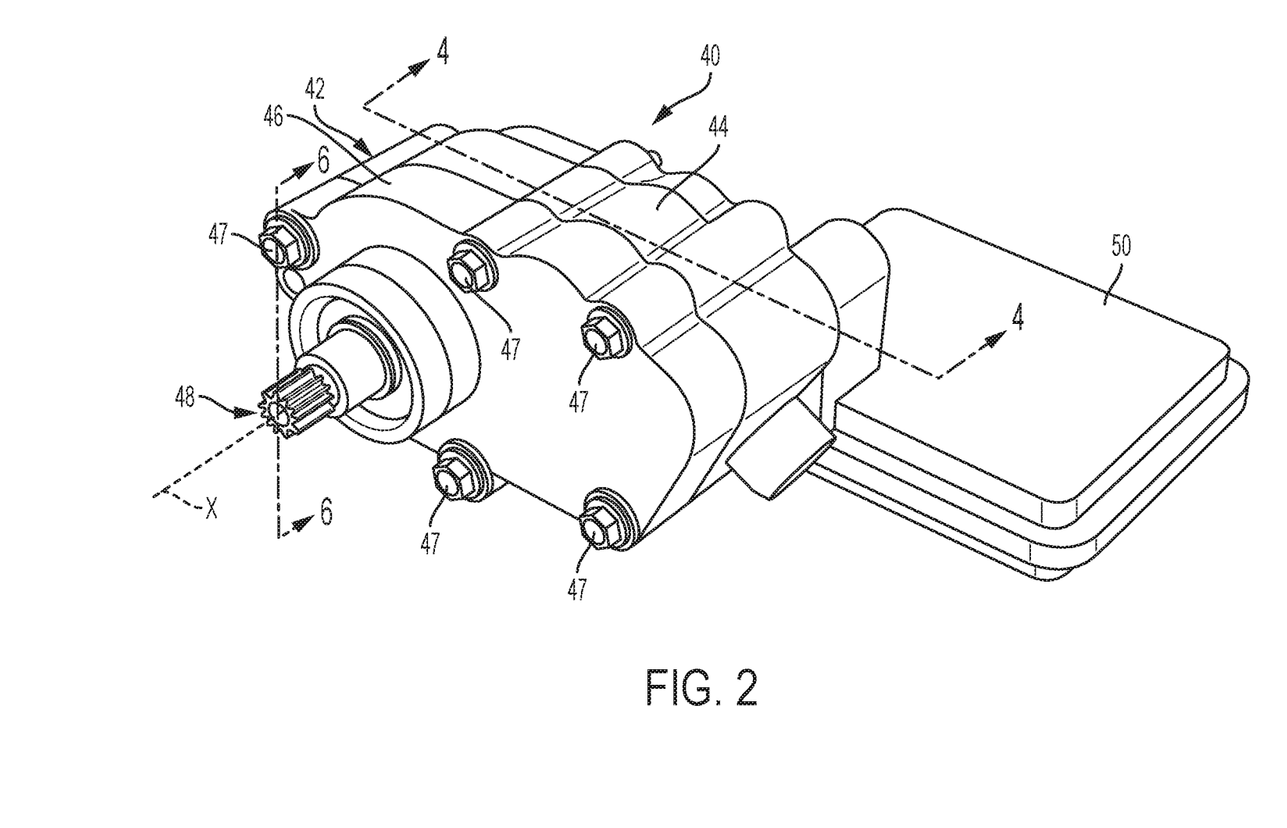
FIG. 2 is a perspective view of the gerotor pump assembly shown in FIG. 1, including a housing structure having a main body portion and a cover, according to the principles of the present disclosure.

Referring now to FIG. 2, additional details of the pump 40 are illustrated. The pump 40 includes a housing structure 42 including a main body portion 44 and a cover 46. The cover 46 is attached to the main body portion 44 of the housing structure 42 via fasteners 47. A shaft 48 extends from the housing structure 44. A filter 50 is provided to filter the fluid being drawn into the pump 40.

Figure 3A:
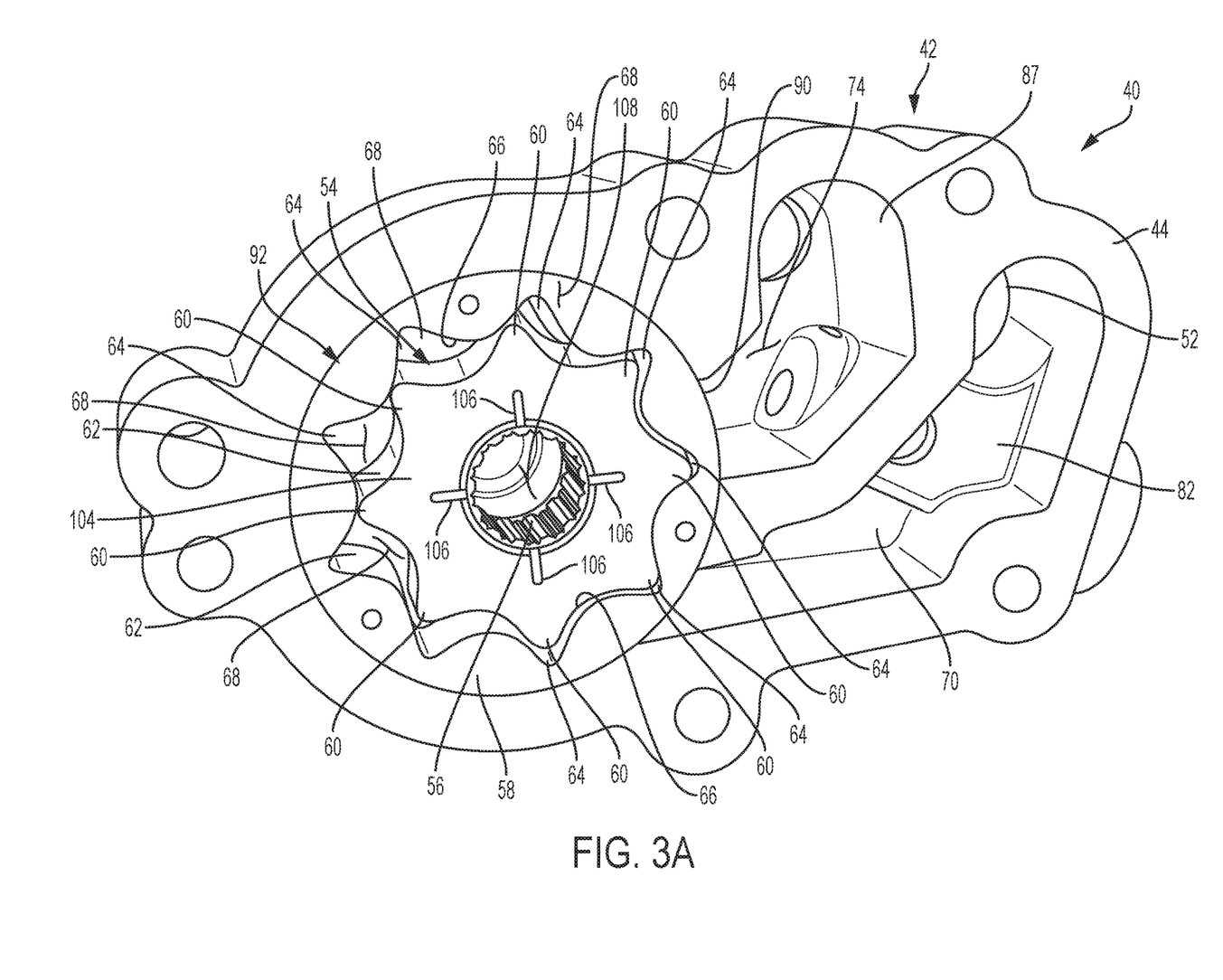
FIG. 3A is a perspective view of the gerotor pump assembly of FIG. 2, with the cover, shaft, and other components removed to expose inner contents, in accordance with the principles of the present disclosure.

Referring to FIG. 3A, parts of the pump 40 are shown without the cover 48 and the shaft 46 to illustrate the inner workings of the pump 40. The pump 40 is a gerotor pump assembly including an inner drive gear 54 (which is coupled to the shaft 48 shown in FIG. 2 via inner splines 56) and an outer driven gear 58. The shaft 48 and the inner drive gear 54 are rotatable about an axis of rotation X defined along a length of the shaft 48. The inner drive gear 54 has a plurality of projections 60 extending outwardly along an outer periphery 62 thereof, wherein the projections 60 may have a generally trochoidal shape.

The outer driven gear 58 surrounds the inner drive gear 54 and defines a plurality of recessions 64 along an inner surface 66, wherein the recessions may also have a generally trochoidal shape corresponding to the shape of the projections 60. The recessions 64 defined by the inner surface 66 of the outer driven gear 58 are configured to engage with the plurality of projections 60 of the inner drive gear 54. Typically, the inner drive gear 54 will have one less projection 60 than the number of recessions 64 of the outer drive gear 58. Some of the projections 60 engage with the recessions 64 as the inner drive gear 54 is rotated (by the shaft 48), which causes by the outer drive gear 58 to rotate about the inner drive gear 54, typically about a different axis of rotation that is not coincident with the axis of rotation X of the shaft 48 and the inner drive gear 54.

The outer driven gear 58 and the inner drive gear 54 further define at least one dynamically-changing fluid cavity 68 therebetween. As the inner drive gear 54 and the outer driven gear 58 rotate with respect to each other, typically multiple dynamically-changed fluid cavities 68 will be formed between the outer radial surface 62 of the inner drive gear 54 and the inner radial surface 66 of the outer driven gear 58.

Figure 3B:
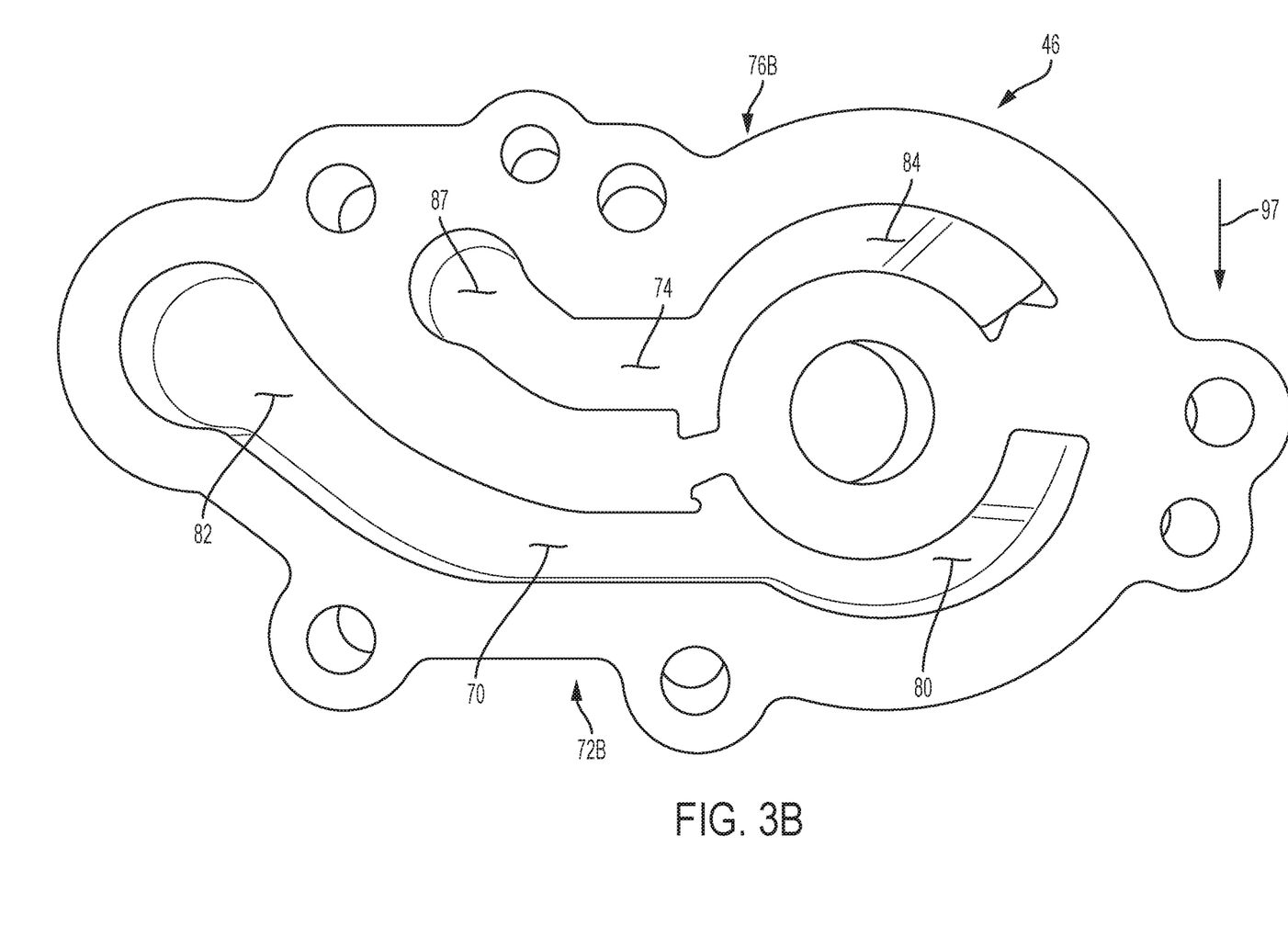
FIG. 3B is a perspective view of an inner side of the cover of the housing structure of the gerotor pump assembly of FIGS. 2-3A, according to the principles of the present disclosure.
Figure 3C:
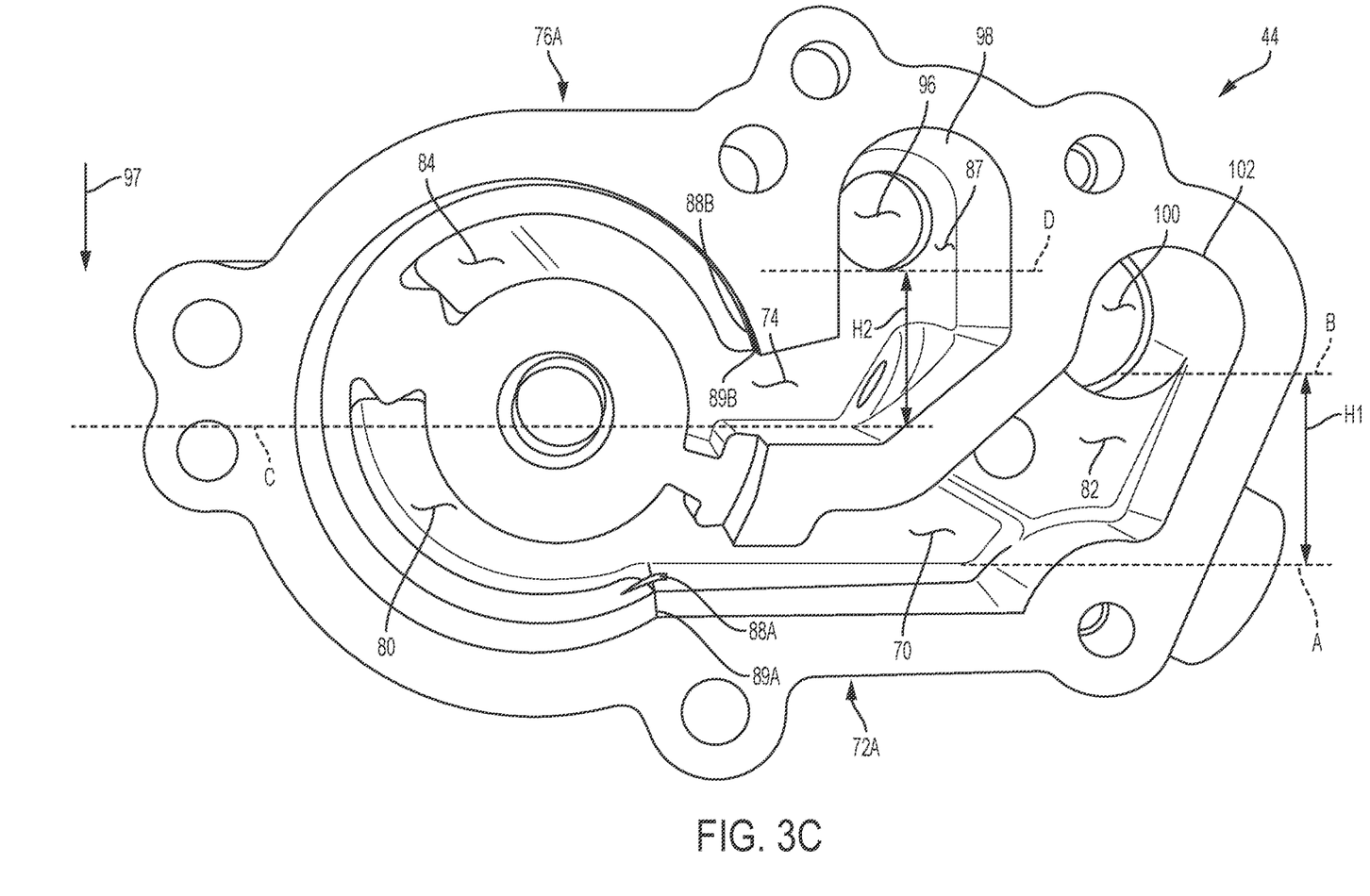
FIG. 3C is a perspective view of the main body portion of the housing structure of the gerotor pump assembly of FIGS. 2-3B, according to the principles of the present disclosure.
Figure 4A:
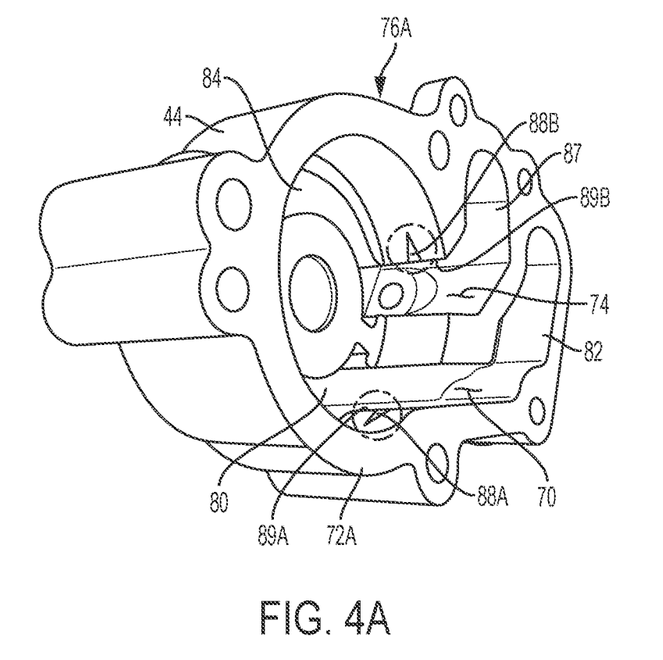
FIG. 4A is a perspective view of a portion of the housing structure of the gerotor pump assembly of FIGS. 2-3C, taken along the line 4-4 in FIG. 2, according to the principles of the present disclosure.
Figure 4B:
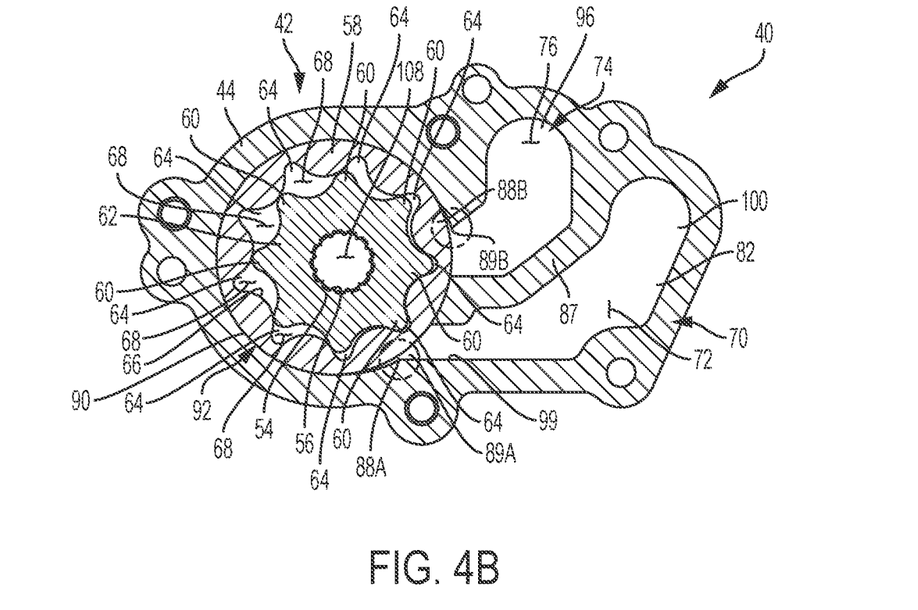
FIG. 4B is a cross-sectional view a portion of the gerotor pump assembly of FIGS. 1-3C, taken along the line 4-4 in FIG. 2, in accordance with the principles of the present disclosure.

Referring to FIGS. 3B-3C, the housing structure 42 includes a cover 46 (shown in FIG. 3B) and a main body portion 44 (shown in FIG. 3C), which cooperate to define two reservoirs 70, 74. A forward inlet fluid reservoir 70 is defined in a lower part 72A of the main body portion 44 and in a lower part 72B of the cover 46, and a forward outlet fluid reservoir 74 is defined in an upper part 76A of the main body portion 44 and in an upper part 76B of the cover 46. The fluid reservoirs 70, 74 are so named because the inner drive gear 54 draws fluid through the filter 50 from the sump (not shown), into the forward inlet fluid reservoir 70, and into the dynamically-changing cavities 68 to be pumped out into the forward outlet fluid reservoir 74 and ultimately to the transmission 26 (or any other desired components).

The forward inlet fluid reservoir 70 has a side chamber 80 in fluid communication with the dynamically-changing fluid cavities 68 of the gears 54, 58 and a holding chamber 82 extending from the side chamber 80. In this example, the side chamber 80 is symmetrically disposed about the outer driven gear 58 and the inner drive gear 54, with a portion of the side chamber 80 being disposed on each side of the gear set 54, 58. A portion of the side chamber 80 is formed in each of the cover 46 and the main body portion 44.

Similarly, the forward outlet fluid reservoir 74 has a side chamber 84 in fluid communication with the dynamically-changing fluid cavities 68 of the gears 54, 58 and a holding chamber 87 extending from the side chamber 84. In this example, the side chamber 84 is symmetrically disposed about the outer driven gear 58 and the inner drive gear 54, with a portion of the side chamber 84 being disposed on each side of the gear set 54, 58. A portion of the side chamber 80 is formed in each of the cover 46 and the main body portion 44.

In the illustrated example, the forward inlet fluid reservoir 70 is in fluid communication with the filter 50. As such, the inner drive gear 54 is configured to draw fluid from a sump (not shown), through the filter 50, and into the forward inlet fluid reservoir 70.

Referring to FIGS. 3B, 3C, 4A, and 4B, each of the fluid reservoirs 70, 74 is enclosed within the housing structure 42 and is configured to supply fluid to a plurality of ports 88A, 88B formed in the main body portion 44. Each of the ports 88A, 88B is preferably formed on a leading edge 89A, 89B of the main body portion 44 of the housing structure 42. The forward inlet fluid reservoir 70 is in fluid communication with the first port 88A, and the forward outlet fluid reservoir 74 is in fluid communication with the second port 88B.

The outer driven gear 58 has a bearing surface 90 along an outer periphery 92 thereof, along which the outer driven gear 58 rotates with respect to the main body portion 44 of the housing structure 42. The first and second ports 88A, 88B are in fluid communication with the bearing surface 90, so that the reservoirs 70, 74 may lubricate the bearing surface 90.

At least a portion of the forward outlet fluid reservoir 74 is located on an upper side of the second port 88B, and the first port 88A is located on a lower side of the second port 88B. Further, the side chamber 84 of the forward outlet fluid reservoir 74 serves as an entrance opening to the fluid reservoir 74, and the fluid reservoir 74 an outlet opening 96 defined through the main body portion 44 of the housing structure 42 at an upper side of the holding chamber 87. The outlet opening 96 is located on an upper side of the second port 88B. In other words, in the orientation of FIG. 3C, where gravity 97 is pointing in a downward direction as shown, the outlet opening 96 of the forward outlet fluid reservoir 74 is above the second port 88B. The outlet opening 96 is located at a distal end 98 of the holding chamber 87.

The side chamber 80 of the forward inlet fluid reservoir 70 serves as an exit opening from the forward inlet fluid reservoir 70 to the dynamically-changing fluid cavities 68, and an inlet opening 100 to the fluid reservoir 70 is defined through the main body portion 44 at an upper side of the holding chamber 82. In the orientation of FIG. 3C, with gravity 97 pointing in a downward direction as shown, the inlet opening 100 of the forward inlet fluid reservoir 70 is above the side chamber 80. The inlet opening 100 is located at a distal end 102 of the holding chamber 82. In this example, the inlet opening 100 is also disposed on an upper side of the second port 88B.

Therefore, oil level (head) H1 is maximized between dashed lines A and B if prime, or fluid, is lost at the inlet 100; and oil level (head) H2 is maximized between dashed lines C and D if prime, or fluid, is lost at the outlet 102 (and the outlet 102 has become the inlet to the system as the pump 40 is operated in the reverse direction).

Figure 5A:
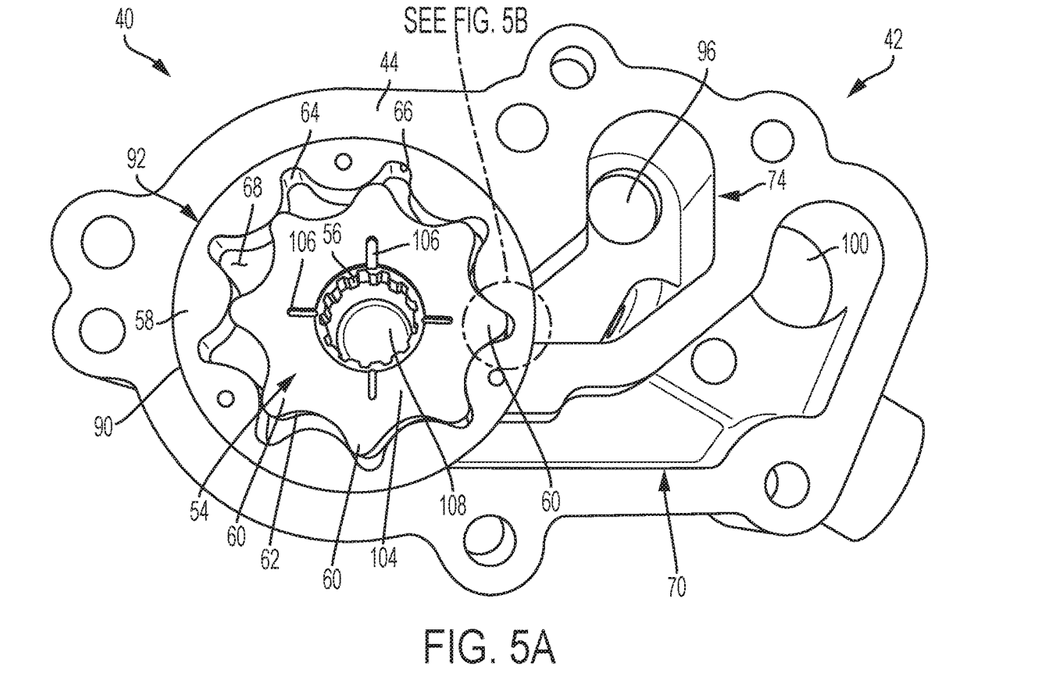
FIG. 5A is a side view of the gerotor pump assembly of FIGS. 2-4B, according to the principles of the present disclosure.
Figure 5B:
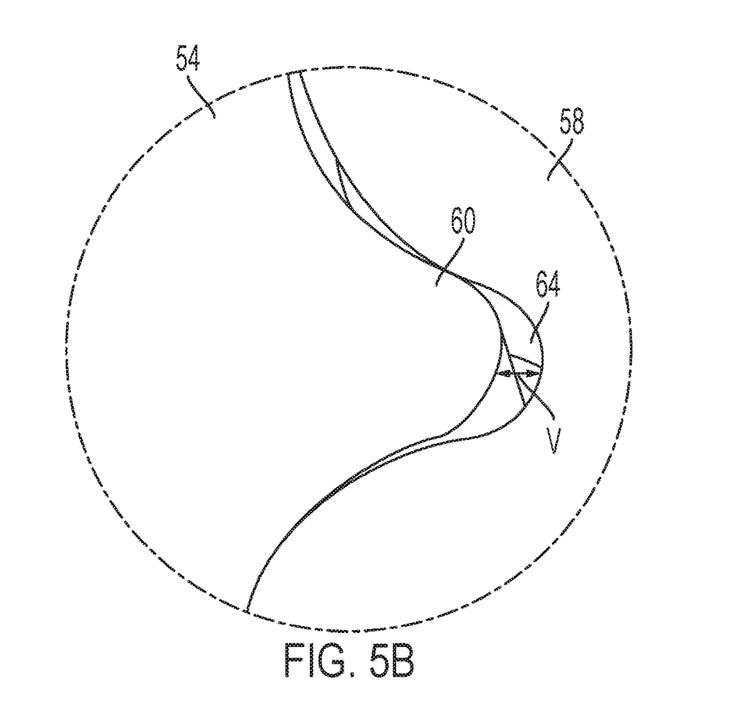
FIG. 5B is a close-up side view of a portion of an inner drive gear and an outer driven gear of the gerotor pump assembly of FIGS. 2-5A, taken along the box 5B in FIG. 5A, in accordance with the principles of the present disclosure.

Referring now to FIGS. 5A and 5B, each projection 60 of the inner drive gear 54 is configured to engage with a recession 64 of the outer driven gear 58 in a fully engaged position, as shown in FIG. 5B. When in the fully engaged position, the inner drive gear 54 and the outer driven gear 58 define an oil transfer volume clearance V between a projection 60 and a recession 64. The oil transfer volume clearance V allows a volume of liquid fluid to remain with the recession 64 even as the pump 40 is working (as the inner drive gear 54 and the outer driven gear 58 are rotating with respect to each other). The remaining oil in the recession 64 assists with lubricating the gears 54, 58 even if prime is lost. In some examples, the oil transfer volume clearance V could be at least 500 microns wide, or even up to 1 millimeter wide, or more.

Referring to FIGS. 3A and 5A, the inner drive gear 54 defines a pump running face 104 along a side of the inner drive gear 54. The pump running face 104 is disposed adjacent to the cover 46 (shown only in FIGS. 2 and 6, and removed from FIGS. 3A and 5A to show the pump running face 104 in FIGS. 3A and 5A). It is desirable to keep the pump running face 104 lubricated because the pump running face 104 rotates with respect to the cover 46. Accordingly, the pump running face 104 defines a plurality of lubrication cavities 106 extending inwardly from an inner pump aperture 108 defined by the splined surface 56 through the pump running face 104.

Figure 6:
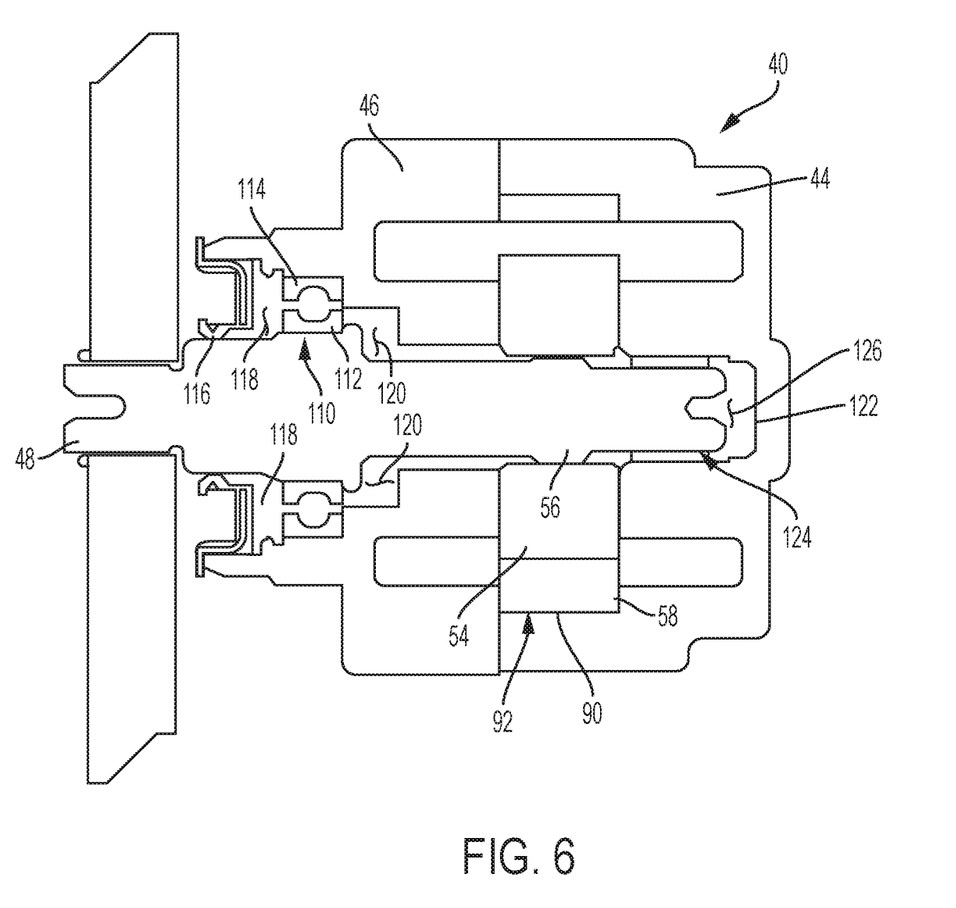
FIG. 6 is a side cross-sectional view of the gerotor pump assembly of FIGS. 2-5B, taken along the line 6-6 in FIG. 2, according to the principles of the present disclosure.

Referring now to FIG. 6, a ball bearing arrangement 110 has an inner race 112 fixed to the shaft 48 and an outer race 114 fixed to the cover 46. A seal 116 is disposed between the shaft 48 and the cover 46. A shaft cavity 118 is defined between the shaft 48, the cover 46, the ball bearing arrangement 110, and the seal 116. The shaft cavity 118 is configured to collect a volume of oil to facilitate lubrication. Oil may also be collected in a pocket 120 between the shaft 48, the ball bearing arrangement 110, and the cover 46.

A bushing cap 122 is disposed over an end 124 of the shaft 48. A hollow space 126 is defined between the bushing cap 122 and the end 124 of the shaft 48. The hollow space 126 is configured to collect another volume of oil therein, to assist with lubrication.

Accordingly, the present disclosure provides a gerotor pump system wherein the inner drive gear 54 is configured to be rotated in a first direction about the axis of rotation X and in an opposite second direction about the axis of rotation X. In some examples, the inner drive gear 54 rotates in the first direction when the vehicle 10 is in a forward drive gear or speed, and the inner drive gear 54 rotates in the second direction when the vehicle 10 is in a reverse drive gear or speed.

Figure 7A:
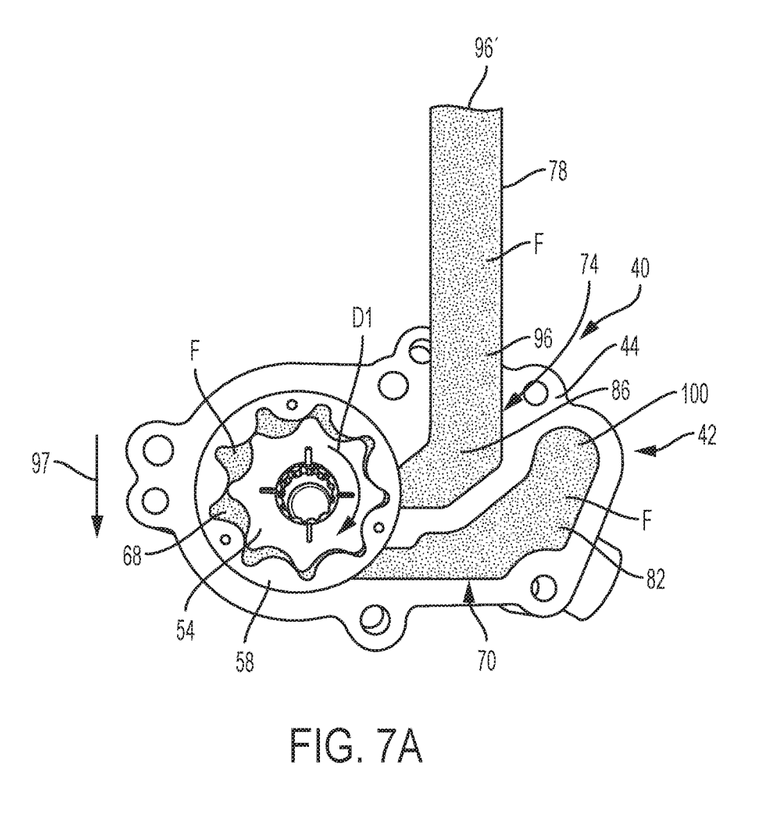
FIG. 7A is a side view of the gerotor pump assembly of FIGS. 2-6, having the cover, the shaft, and the containers removed for clarity, showing the gerotor pump assembly operating in a primed condition in a first direction, in accordance with the principles of the present disclosure.

Referring to FIG. 7A, when the system is fully primed with liquid fluid and the pump 40 is running the forward (or first) direction D1, liquid fluid F is pumped from the forward inlet fluid reservoir 70, through the dynamically-changing fluid cavities 68, and then into the forward outlet fluid reservoir 74 and out of the pump 40. In this example, a standpipe 78 is added to the outlet opening 96 to raise the effective opening 96' of the holding chamber 86 to the top of the standpipe 78, to hold additional liquid fluid. Though not shown, a standpipe could also be connected to the forward inlet fluid reservoir 70, if desired.

Figure 7B:
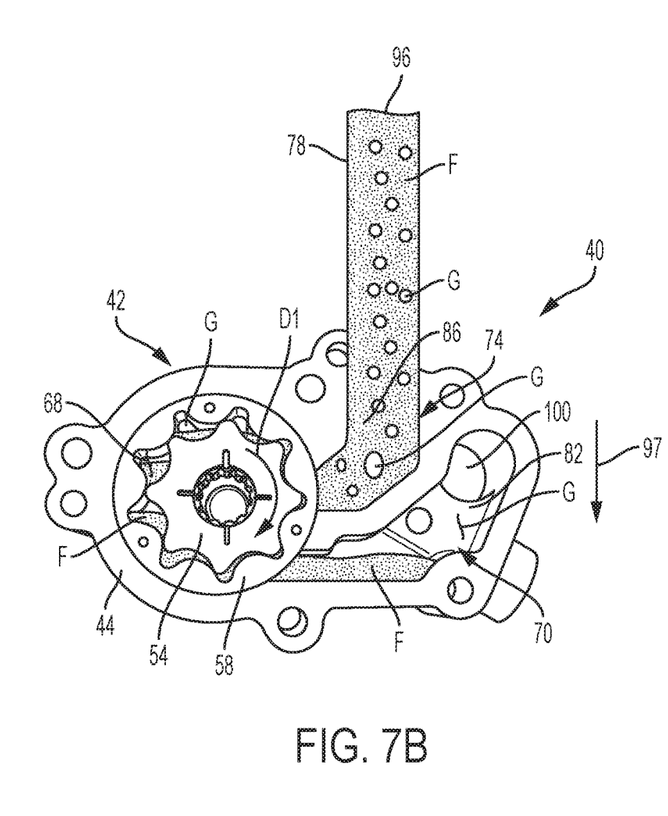
FIG. 7B is a side view of the gerotor pump assembly of FIGS. 2-7A, having the cover, the shaft, and the containers removed for clarity, showing the gerotor pump assembly operating in a loss-of-prime condition in a first direction, in accordance with the principles of the present disclosure.

Referring to FIG. 7B, the system is illustrated with some loss of liquid fluid coverage (e.g., oil coverage) over the inlet opening 100, or the filter 50 or other conduit to which the opening 100 is connected, of the forward inlet fluid reservoir 70. This condition may be referred to as a loss of prime.

When prime is lost, the liquid fluid F disposed in the forward inlet fluid reservoir 70 is pumped by the inner drive gear 54, and the liquid fluid F begins to drain down within the fluid inlet fluid reservoir 70. However, due to the storage of liquid fluid F in the forward inlet fluid reservoir 70 during normal operation (as shown in FIG. 7A), liquid fluid F remains in the forward inlet fluid reservoir 70 until all of the liquid fluid F in the forward inlet fluid reservoir 70, and any attached standpipe (not shown), is used up and pumped by the inner drive gear 54. As the liquid fluid F level decreases in the forward inlet fluid reservoir 70, air G (or gaseous fluid) is introduced into the dynamically-changing fluid cavities 68, along with some of the liquid fluid F. The inner drive gear 54 and the outer driven gear 58 are configured to maintain oil within the oil transfer volume clearance V as the inner drive gear 54 is rotated in the first direction D1, even in the loss of prime condition. The dynamically-changing fluid cavities 68 may then contain a mixture of oil F and air G, and the oil F provides sufficient lubrication of the pump components.

Figure 8A:
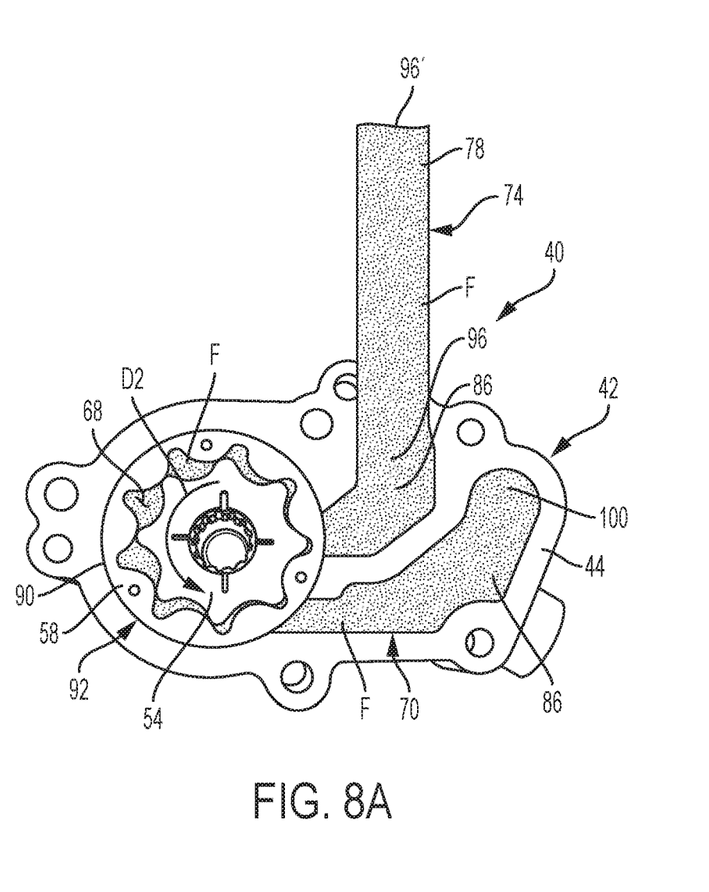
FIG. 8A is a side view of the gerotor pump assembly of FIGS. 2-7B, having the cover, the shaft, and the containers removed for clarity, showing the gerotor pump assembly operating in a primed condition in a second direction, in accordance with the principles of the present disclosure.

Referring now to FIG. 8A, the inner drive gear 54 may be rotated in a second (or reverse) direction D2. When the pump 40 is being operated in the reverse direction D2, the forward outlet fluid reservoir 74 becomes the inlet and the forward inlet fluid reservoir 70 becomes the outlet to the set of gears 54, 58. When the system is fully primed with fluid and the pump 40 is running in the reverse (or second) direction D2, liquid fluid F is pumped from the forward outlet fluid reservoir 74, through the dynamically-changing fluid cavities 68, and then into the forward inlet fluid reservoir 70 and out of the pump 40 through the opening 100.

Figure 8B:
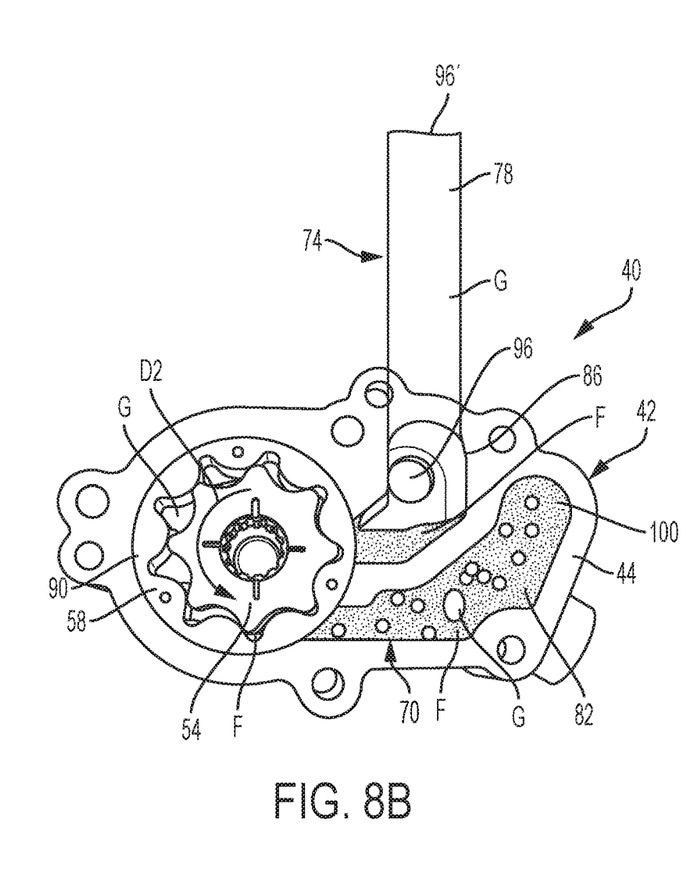
FIG. 8B is a side view of the gerotor pump assembly of FIGS. 2-8A, having the cover, the shaft, and the containers removed for clarity, showing the gerotor pump assembly operating in a loss-of-prime condition in a second direction, in accordance with the principles of the present disclosure.

Referring to FIG. 8B, the system is illustrated with some loss of liquid fluid coverage (e.g., oil coverage) over the opening 96 of the forward outlet fluid reservoir 74. Accordingly, the liquid fluid F disposed in the forward outlet fluid reservoir 74 and the attached standpipe 78 is pumped by the inner drive gear 54, and the liquid fluid F begins to drain down within the standpipe 78 and the holding chamber 86 of the forward outlet fluid reservoir 74. However, due to the storage of liquid fluid F in the standpipe 78 and in the holding chamber 86 of the forward outlet fluid reservoir 74 during normal operation (as shown in FIG. 8A), liquid fluid F remains in the forward outlet fluid reservoir 74 until all of the liquid fluid F in the forward outlet fluid reservoir 74 is used up and pumped by the inner drive gear 54. As the liquid fluid F level decreases in the forward outlet fluid reservoir 74, air G (or gaseous fluid) is introduced into the dynamically-changing fluid cavities 68, along with some of the liquid fluid F.

The inner drive gear 54 and the outer driven gear 58 are configured to maintain oil within the oil transfer volume clearance V as the inner drive gear 54 is rotated in the second direction D2, as well as when the inner drive gear 54 is rotated in the first direction D1, to provide lubrication to the gears 54, 58. As liquid fluid F becomes scarcer, as illustrated in FIGS. 7B and 8B, the lubrication provided by the lubrication cavities 106 on the pump running face 104 and within the shaft cavity 118 and cavity 120 adjacent thereto, as well as the hollow space 126 near the bushing cap 122 also assist with lubricating the pump assembly 40.

Figure 9:
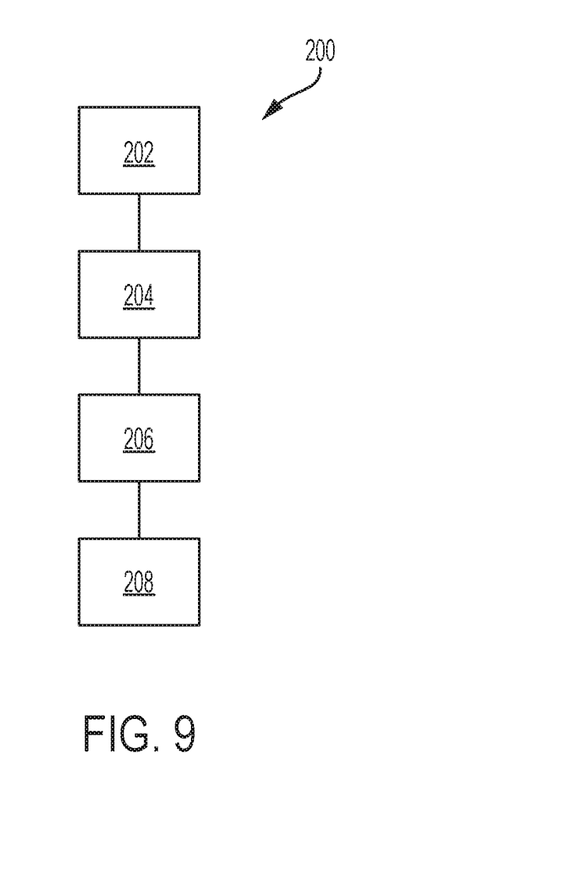
FIG. 9 is a block diagram illustrating a method of operating a gerotor pump assembly for an automotive transmission of a motor vehicle in a loss-of-prime mode, according to the principles of the present disclosure.

Referring now to FIG. 9, a block diagram illustrates a method 200 of operating a gerotor pump assembly of a motor vehicle in a loss-of-prime mode. The method 200 may incorporate elements and functionalities of the pump assembly 40 described above, by way of example.

The method 200 includes a step 202 of rotating an inner drive gear, such as the inner drive gear 54, in a first direction, such as D1, about an axis of rotation, such as axis X. As described above, the inner drive gear 54 may have a plurality of projections 60 extending outwardly along an outer periphery 62 thereof and an outer driven gear 58 surrounding the inner drive gear 54 and defining a plurality of recessions 64 along an inner surface 66 configured to engage with the projections 60 of the inner drive gear 54. The outer driven gear 58 and the inner drive gear 54 further define at least one dynamically-changing fluid cavity 68 therebetween, each projection 60 being configured to engage with a recession 64 in a fully engaged position, and wherein the inner drive gear 54 and the outer driven gear 58 define an oil transfer volume clearance V between a projection 60 and a recession 64 in the fully engaged position.

The method 200 further includes a step 204 of maintaining oil within the oil transfer volume clearance V as the inner drive gear 54 is rotated in the first direction D1. In addition, the method 200 may optionally include a step 206 of rotating the inner drive gear 54 in a second direction D2 about the axis of rotation X, the second direction D2 being opposite the first direction D1. The method 200 may include a step 208 of maintaining oil within the oil transfer volume clearance V as the inner drive gear 54 is rotated in the second direction D2.

The method 200 may also include further optional steps, including: adding oil into a forward outlet fluid reservoir 74 when the inner drive gear 54 is rotated in the first direction D1; adding oil into a forward inlet fluid reservoir 70 when the inner drive gear 54 is rotated in the second direction D2; lubricating a pump running face 104 of the inner drive gear 54 via a plurality of lubrication cavities 106 defined within the pump running face 104; lubricating a bearing surface 90 disposed along an outer periphery 92 of the outer driven gear 58 via at least one of a first port 88A in fluid communication with the forward inlet fluid reservoir 70 and a second port 88B in fluid communication with the forward outlet fluid reservoir 74; collecting oil within a shaft cavity 118 defined between a seal 116, a cover 46, a ball bearing arrangement 110, and a shaft 48 upon which the inner drive gear 54 is mounted; and collecting oil within a hollow space 126 defined between the shaft 48 and a bushing cap 122 attached to an end 124 of the shaft 48.

The method 200 may include any desired additional elements and steps, such as those described above with respect to FIGS. 1-9B. The control system 38 may be configured to implement the method 200. Furthermore, the control system 38 may be or include a controller that includes a number of control logics that are configured to execute the steps of the method 200.

The control system 38 preferably includes at least one controller, but may include a plurality of controller devices wherein each of the controllers may be associated with monitoring and controlling a single system. This may include an engine control module (ECM) for controlling the engine 12, a transmission controller (TCM) for controlling the transmission 14, and one or more other controllers for controlling the drive unit 22.

The control system 38 preferably includes at least one processor and at least one memory device (or any non-transitory, tangible computer readable storage medium) on which are recorded instructions for executing instruction sets for controlling the parts of the drive unit 22, including the electric motor 24, and the pump assembly 40. The memory device can store controller-executable instruction sets, and the processor can execute the controller-executable instruction sets stored in the memory.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component may be capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality.

Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms can include any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event.

Communication between controllers, and communication between controllers, actuators and/or sensors may be accomplished using a direct wired link, a networked communication bus link, a wireless link or any another suitable communication link. Communication includes exchanging data signals in any suitable form, including, for example, electrical signals via a conductive medium, electromagnetic signals via air, optical signals via optical waveguides, and the like.

Data signals may include signals representing inputs from sensors, signals representing actuator commands, and communication signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

The controller(s) of the control system 38 may include a computer-readable medium (also referred to as a processor-readable medium), including any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store may be included within a computing device employing a computer operating system such as one of those mentioned above, and may be accessed via a network in any one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or figures are supportive and descriptive of the many aspects of the present disclosure. While certain aspects have been described in detail, various alternative aspects exist for practicing the invention as defined in the appended claims.

What is claimed is:

1. A gerotor pump assembly comprising:
a shaft;
an inner drive gear coupled to the shaft, the shaft and the inner drive gear being rotatable about an axis of rotation defined along a length of the shaft, the inner drive gear having a plurality of projections extending outwardly along an outer periphery thereof, the inner drive gear defining a pump running face along a side of the inner drive gear, the pump running face defining a lubrication cavity therein, the inner drive gear defining an inner aperture extending through the inner drive gear along the axis of rotation, the lubrication cavity extending within the pump running face from the inner aperture;
an outer driven gear surrounding the inner drive gear and defining a plurality of recessions along an inner surface configured to engage with the plurality of projections of the inner drive gear, the outer driven gear and the inner drive gear further defining at least one dynamically-changing fluid cavity therebetween, each projection being configured to engage with a recession of the plurality of recessions in a fully engaged position, the inner drive gear and the outer driven gear defining an oil transfer volume clearance between a projection and a recession in the fully engaged position, the outer driven gear having a bearing surface along an outer periphery thereof; and
a housing structure defining a forward inlet fluid reservoir therein and a first port connecting the forward inlet fluid reservoir to the at least one dynamically-changing fluid cavity, the housing structure further defining a forward outlet fluid reservoir therein and a second port connecting the forward outlet fluid reservoir to the dynamically-changing fluid cavity, at least a portion of the forward outlet fluid reservoir being located on an upper side of the second port, the first port being located on a lower side of the second port, the forward outlet fluid reservoir having an outlet opening defined on an upper side of the second port, the forward inlet fluid reservoir having an inlet opening defined on an upper side of the first port, the inlet opening being located on an upper side of the second port, the housing structure comprising a main body portion and a cover attached to the main body portion, the cover being disposed adjacent to the pump running face, the first and second ports being formed on a leading edge of the main body portion of the housing structure, the forward inlet fluid reservoir being formed in both the main body portion and the cover of the housing structure, the forward inlet fluid reservoir having a first side chamber symmetrically disposed about the outer driven gear, the forward outlet fluid reservoir being formed in both the main body portion and the cover of the housing structure, the forward outlet fluid reservoir having a second side chamber symmetrically disposed about the outer driven gear.

2. The gerotor pump assembly of claim 1, further comprising:
a ball bearing arrangement having an inner race fixed to the shaft and an outer race fixed to the cover; and
a seal disposed between the shaft and the cover, a shaft cavity being defined between the shaft, the cover, the ball bearing arrangement, and the seal, the shaft cavity being configured to collect a first volume of oil.

3. The gerotor pump assembly of claim 2, further comprising a bushing cap disposed over an end of the shaft, the gerotor pump assembly defining a hollow space between the bushing cap and the end of the shaft configured to collect a second volume of oil therein.

4. The gerotor pump assembly of claim 1, the forward inlet fluid reservoir being in fluid communication with a filter, the inner drive gear being configured to draw fluid from a sump, through the filter, and into the forward inlet fluid reservoir.

5. The gerotor pump assembly of claim 1, the oil transfer volume clearance being at least 500 microns wide.

6. A method of operating a gerotor pump assembly for an automotive transmission of a motor vehicle in a loss-of-prime mode, the method comprising:
rotating an inner drive gear in a first direction about an axis of rotation, the inner drive gear having a plurality of projections extending outwardly along an outer periphery thereof, an outer driven gear surrounding the inner drive gear and defining a plurality of recessions along an inner surface configured to engage with the plurality of projections of the inner drive gear, the outer driven gear and the inner drive gear further defining at least one dynamically-changing fluid cavity therebetween, each projection being configured to engage with a recession of the plurality of recessions in a fully engaged position, the inner drive gear and the outer driven gear defining an oil transfer volume clearance between a projection and a recession in the fully engaged position;
maintaining oil within the oil transfer volume clearance as the inner drive gear is rotated in the first direction;
lubricating a pump running face of the inner drive gear via a plurality of lubrication cavities defined within the pump running face, each lubrication cavity of the plurality of lubrication cavities extending within the pump running face from a central aperture of the inner drive gear, the central aperture extending along the axis of rotation;
rotating the inner drive gear in a second direction about the axis of rotation, the second direction being opposite the first direction;
maintaining oil within the oil transfer volume clearance as the inner drive gear is rotated in the second direction;
adding oil into a forward outlet fluid reservoir when the inner drive gear is rotated in the first direction;
adding oil into a forward inlet fluid reservoir when the inner drive gear is rotated in the second direction;
lubricating a bearing surface disposed along an outer periphery of the outer driven gear via at least one of a first port in fluid communication with the forward inlet fluid reservoir and a second port in fluid communication with the forward outlet fluid reservoir;
collecting oil within a shaft cavity defined between a seal, a cover, a ball bearing arrangement, and a shaft upon which the inner drive gear is mounted; and
collecting oil within a hollow space defined between the shaft and a bushing cap attached to an end of the shaft.

7. A system for providing lubrication to a gerotor pump assembly, the system comprising:
a shaft;
an inner drive gear coupled to the shaft, the shaft and the inner drive gear being rotatable about an axis of rotation defined along a length of the shaft, the inner drive gear having a plurality of projections extending outwardly along an outer periphery thereof;
an outer driven gear surrounding the inner drive gear and defining a plurality of recessions along an inner surface configured to engage with the plurality of projections of the inner drive gear, the outer driven gear and the inner drive gear further defining at least one dynamically-changing fluid cavity therebetween, each projection being configured to engage with a recession of the plurality of recessions in a fully engaged position, the inner drive gear and the outer driven gear defining an oil transfer volume clearance between a projection and a recession in the fully engaged position,
wherein the inner drive gear is configured to be rotated in a first direction about the axis of rotation and a second direction about the axis of rotation, the first direction being opposite the second direction, the inner drive gear and the outer driven gear being configured to maintain oil within the oil transfer volume clearance as the inner drive gear is rotated in the first direction and in the second direction; and
a housing structure defining a forward inlet fluid reservoir therein and a first port connecting the forward inlet fluid reservoir with the at least one dynamically-changing fluid cavity, the housing structure further defining a forward outlet fluid reservoir therein and a second port connecting the forward outlet fluid reservoir with the at least one dynamically-changing fluid cavity, at least a portion of the forward outlet fluid reservoir being located on an upper side of the second port, the first port being located on a lower side of the second port, the forward outlet fluid reservoir having an outlet opening defined on an upper side of the second port, the forward inlet fluid reservoir having an inlet opening defined on an upper side of the first port, the inlet opening being located on an upper side of the second port, the inner drive gear defining a pump running face along a side of the inner drive gear, the pump running face defining a plurality of lubrication cavities therein, the outer driven gear having a bearing surface along an outer periphery thereof, the system being configured to:
lubricate the pump running face of the inner drive gear via the plurality of lubrication cavities;
add oil into the forward outlet fluid reservoir when the inner drive gear is rotated in the first direction;
add oil into the forward inlet fluid reservoir when the inner drive gear is rotated in the second direction; and
lubricate the bearing surface via the first port and the second port,
the housing structure comprising a main body portion and a cover attached to the main body portion, the system further comprising:
a ball bearing arrangement having an inner race fixed to the shaft and an outer race fixed to the cover;
a seal disposed between the shaft and the cover, a shaft cavity being defined between the shaft, the cover, the ball bearing arrangement, and the seal, the shaft cavity being configured to collect oil therein; and
a bushing cap disposed over an end of the shaft, the gerotor pump assembly defining a hollow space between the bushing cap and the end of the shaft, the hollow space configured to collect oil therein.

* * * * *